United States Patent [19]

Riccio et al.

[11] Patent Number: 4,521,475

[45] Date of Patent: Jun. 4, 1985

[54] METHOD AND APPARATUS FOR APPLYING METAL CLADDING ON SURFACES AND PRODUCTS FORMED THEREBY

[76] Inventors: Louis M. Riccio, 161 Hollow Rd., Malvern, Pa. 19355; Alexander Bosna, 814 Washington St., Cape May, N.J. 08204

[21] Appl. No.: 563,430

[22] Filed: Dec. 20, 1983

Related U.S. Application Data

[63] Continuation-in-part of Ser. No. 481,412, Apr. 1, 1983.

[51] Int. Cl.3 .......................... B32B 3/06; B32B 3/20

[52] U.S. Cl. .................................. 428/142; 428/143; 428/213; 428/325

[58] Field of Search .................. 428/309.9, 313.9, 141, 428/142, 143, 145, 148, 149, 213, 306.6, 307.3, 307.7, 308.4, 313.3, 313.5, 319.1, 325

[56] References Cited

U.S. PATENT DOCUMENTS

| | | | |
|---|---|---|---|
| 819,125 | 5/1906 | Coleman | 427/205 |
| 3,097,932 | 7/1963 | Goldheim | 427/423 |
| 3,144,349 | 8/1964 | Swingler et al. | 427/154 |
| 3,179,531 | 4/1965 | Koubek | 427/423 |
| 3,325,303 | 6/1967 | Lant et al. | 427/203 |
| 3,476,577 | 11/1969 | Davie | 428/325 |
| 4,182,641 | 1/1980 | Fitts | 428/309.9 |
| 4,226,906 | 10/1980 | Jacob | 428/313.9 |
| 4,303,730 | 12/1981 | Torobin | 428/333 |
| 4,307,142 | 12/1981 | Blitstein et al. | 428/143 |

FOREIGN PATENT DOCUMENTS

| | | | |
|---|---|---|---|
| 135851 | 10/1979 | Japan | 428/313.3 |
| 33485 | 4/1981 | Japan | 427/423 |

*Primary Examiner*—William J. Van Balen

*Attorney, Agent, or Firm*—Jim Zegeer

[57] ABSTRACT

Small, preferably micronsized hollow glass or ceramic spheres or foaming agents for making such micronsized hollow spaces or voids are incorporated into a resin material which is formed into a layer and after curing of the resin layer, it is abraded, sand or grit blasted so as to rupture the outermost layer of spheres or voids to provide a plurality of undercuts or nooks and crannies. A thermally sprayed metal, such as copper, becomes embedded into the undercuts pores, nooks and crannies, such that the bond or adherent strength is greatly improved. This micronsized glass, ceramic spheres and/or pores greatly increases the bond strength by providing better undercuts in the surface to be sprayed by molten metal and provide the capability of depositing thicker layers without jeopardizing the bond.

24 Claims, 13 Drawing Figures

(Enlargement of Blocked
Section of Fig. 3)

ABRAIDED SURFACE & CLEANED

ECCD SPHERES FA-B #24

ABRAIDED SURFACE & CLEANED

ECCD SPHERES FA-B #25

20% by volume of 3M Microballoons floated to top during slow curing cycle illustrates the mechanism by which the sprayed copper flows into the porous surface to effect a strong bond heavily filled (50 to 80%) are very thixotropic (the spheres stay fixed)

SEM - Copper sprayed on UV epoxy largest microballoon 100µ .005" copper 1st and 2nd pass.

SEM- As sprayed surface - copper on UV epoxy

METHOD AND APPARATUS FOR APPLYING METAL CLADDING ON SURFACES AND PRODUCTS FORMED THEREBY

This application is a continuation-in-part of our application Ser. No. 06/481,412 filed Apr. 1, 1983, entitled "METHOD AND MEANS OF APPLYING ANTI-FOULING ON MARINE HULLS".

BACKGROUND AND BRIEF DESCRIPTION OF THE INVENTION

The application of metal coatings to various surfaces by means of thermally sprayed molten metal particle is well known in the art. In our above referenced patent application, we disclosed the application of anti-fouling coatings using this thermal spraying technique to marine structures, particularly hulls of boats and ships, but the process is also applicable generally to such exemplary structures as underwater pilings, power plant intake ducts, underwater energy conversion systems, buoys and the like where the fouling by marine growth interferes with or impedes the efficient operation of such apparatus.

As set forth in our application Ser. No. 481,412 entitled, "METHOD AND MEANS OF APPLYING ANTI-FOULING ON MARINE HULLS", various systems have been devised for applying anti-fouling substances, typically copper and copper alloys, to marine surfaces such as copper foils or in the form of panels or tiles which are adhered to hull surfaces. The most modern of these are paint and coating technologies depend on uniform consumption of the binder and toxin and biocide and therefore are limited by the thickness or number of coatings applied. In the tile or foil methods, painstaking tailoring of individual panels or tiles to the complete hull surfaces has, in general, not been found acceptable by the marine trades. In our above-identified application, we disclose a method of providing marine surfaces with anti-fouling metal layers such as metallic copper/copper nickel which are thermally sprayed or deposited on a previously applied coat of resinous material. The anti-fouling system included a resin layer which could be a polyurethane a polyester or epoxy resin which served two main functions: (1) provides an adhesive between the hull and a spray deposited copper or copper coating and (2) a seal layer to seal fine cracks in the gel coat of a fiberglass hull, for example, and (3) to prevent osmosis and a dielectric layer in the case of a steel hull to prevent electrolytic corrosion effects. The present invention provides a distinct improvement over the process disclosed in that application. This application includes incorporating hollow glass or ceramic spheres in the micronsize range (marketed under various trademarks such as Microballoons TM, Microspheres TM) or the deposition of a foamed resin surface onto the resin layer which can be an air, heat or UV cured resin. This layer serves as the sealing and holding the firmly thermally sprayed anti-fouling coating. The mechanism is relatively simple in that the heavily filled layer is abraded by sanding or grit blasting sufficient to rupture, sheer and/or fracture the embedded micronspheres, microballoons or foamed voids. After the abrading process is completed, the surface is vacuumed or washed clean to remove the abraided material so that the surface now represents a porous surface with large numbers of undercuts, nooks and crannies. The sprayed molten copper now becomes embedded into these pores and in this manner, the bond strength is mechanically fixed. In the original application, the simple grit blasting provided adhesion of a thin layer of copper but if the heavier layer was desposited by the addition of multiple layers, the shrinkage of the copper could possibly cause sufficient stress to overcome the bond strength.

BRIEF DESCRIPTION OF THE DRAWINGS

Other objects, advantages and features of the invention will become more apparent when considered in light of the following specification and accompanying drawings wherein.

DETAILED DESCRIPTION OF THE INVENTION

As noted in our application Ser. No. 481,412, applying metallic coatings on surfaces by thermal spraying is not, per se, new as is shown in Miller U.S. Pat. No. 4,078,097. The thermal spray processes include melting powder in an electric or oxyacetylene arc and using compressed air or inert gas to propel the molten particles toward the substrate at a high velocity. Another form of thermal spray is the plasma arc whereby the powder or wire introduced into a high-velocity plasma arc created by the rapid expansion of gas subjected to electric arc heating in a confined volume. Another thermal spray process that is used, is the combustion of oxygen and fuel in a confined volume and its expansion through a nozzle provide the high velocity flow into which metal powder is introduced coincidental with the projected gas stream. The mechanism of attachment is that molten particles of copper which can be travelling at hypersonic speeds, greater than 5 times the speed of sound or estimated at 6,000 feet per second (with certain types of equipment) will flow into the undercuts, nooks and crannies and the first layer forms the basis upon which subsequent layers of metal can be deposited to build-up to a desired thickness. The molten particles of metal forced into the nooks, crannies and undercuts and roughness of the surface produces a much stronger and more dense flexible layer of cladded metal which, in the case of copper or copper based alloys, are very useful in providing marine anti-fouling surfaces.

Piping made of concrete, steel, etc., can easily have the internal surfaces thereof treated according to the process of this invention to reduce and eliminate flow impeding growths.

Figure 1:
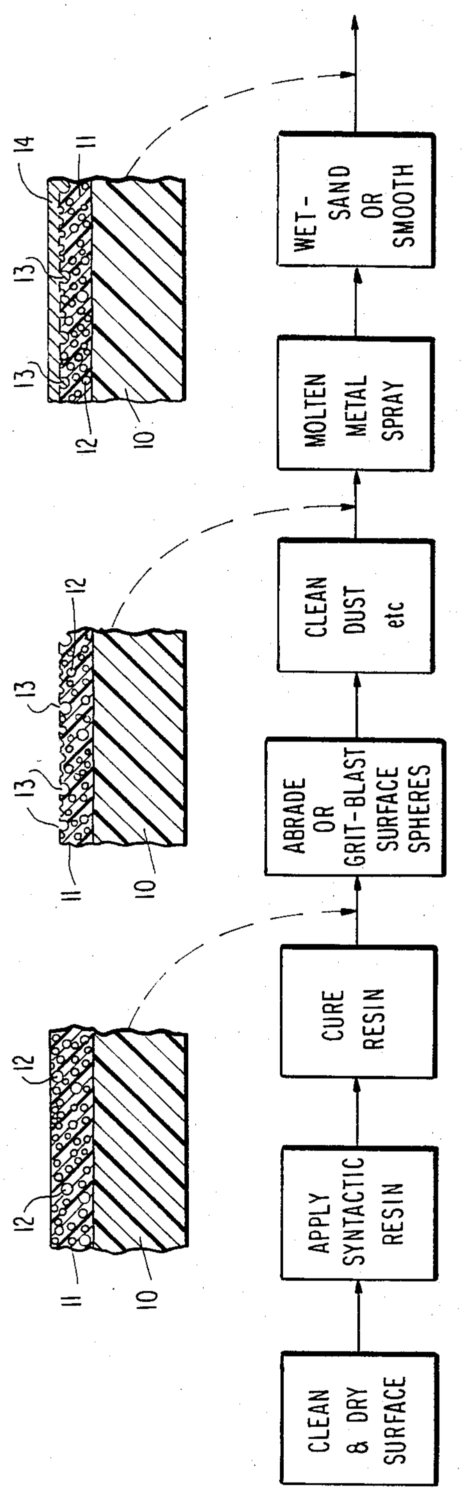
FIG. 1 is a close diagram illustrating the basic steps of the metal clading process according to the invention, the balloons are enlargements of cross-sections of the product as it emerges from each of the indicated steps of the process.
Figure 2:
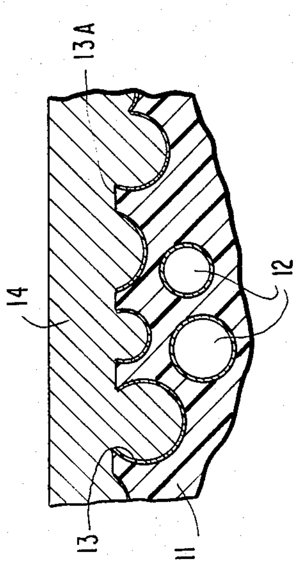
FIG. 2 is an enlarged setional view showing undercuts, nooks and crannies and the filling of same with a copper/copper alloy type metal for cladding marine surfaces and the like, FIGS. 3–7 are photographic enlargements of the surface and metallographic cross-section of actual surfaces cladded using the processes of this invention.
Figure 3:
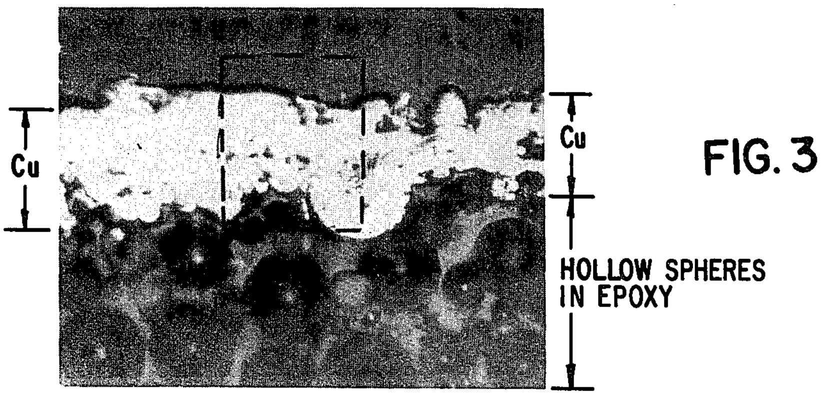
Figure 4:
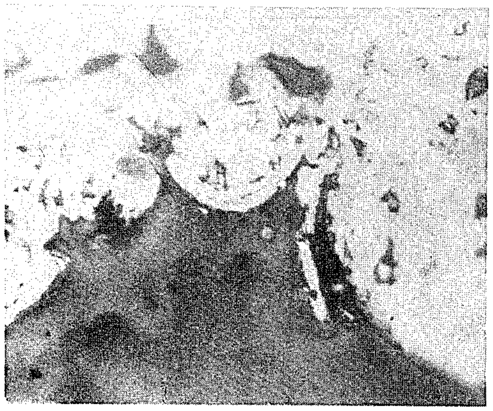
Figure 5:
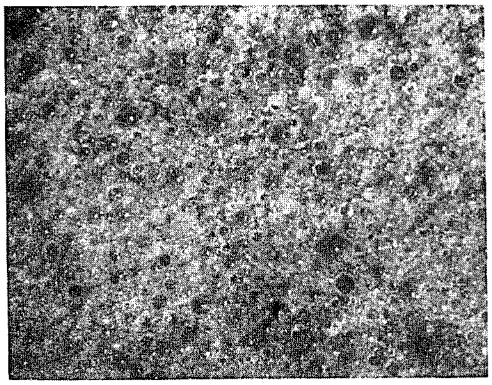
Figure 6:
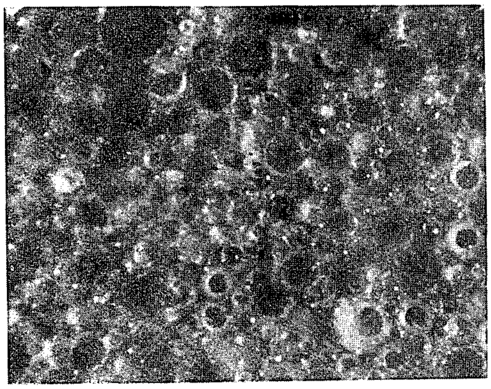

As shown in FIG. 1, the initial step of applying a coating of copper or copper alloy to a substrate surface such as a marine hull is surface preparation. By applying a syntactic foam resin coating followed by a coating of sprayed copper on an abraided grit-blasted cure syntactic resin layer. For the conventional gel coat of a fiberglass hull, for example, the grit blasting is with No. 20–80 grit silicon oxide, silicon carbide, or aluminum oxide to remove the high polish of the finish so that it has a matte appearance wherein microscopic pits, pores and crevaces in the gel coat are exposed and depending upon the character of the blast media, various forms of undercuts are made in the surface. It will be appreciated that surface preparation will not alter the structural integrity and hydrodynamic surface of the hull. Surface preparation consists of removing mold release agents and other foreign matter from the surface of a new hull. The copper/copper alloy coating can be thermally sprayed onto a properly prepared metal, wooden or ferro-cement hull.

A syntactic foam resin or gel layer 11 is uniformly applied over the prepared surface by brush, trowel, spray or roller. As noted earlier, the resin gel layer has incorporated therein 20–80% by volume of micronsized glass or ceramic spheres 12. In one preferred practice, the glass sphere filled resin is applied by commercial low pressure spray equipment so as to not prematurely damage the spheres. In one example of the spray technique, several layers were applied, each to thickness of about ten thousandths of an inch, with the glass sphere filled resin layer having a thickness of about thirty thousandths of an inch in three applications. The microsize glass spheres appeared to be uniformly dispersed in the layer and when grit blasted or abraided and sprayed with molten copper, superb mechanical adhesion was achieved. The resin is cured and then abraided or grit-blasted sufficiently to shear and fracture or rupture the embedded spheres to provide numerous undercuts, crevices, nooks and crannies 13. This porous surface is then vacuumed and the molten metal 14 sprayed thereupon.

It will be appreciated that surfaces which are not desired to have a copper coating, such as above the water line, can be protected by masking tape, etc., as noted in our above-identified application. The metal coating layer is preferably uniform but this is not necessary. In fact, in areas where there may be heavy mechanical wear or errosion, such as on the keel, bow and rudder areas, the metal layer can easily be made slightly thicker just by spraying additional layers in those areas.

Figure 7:
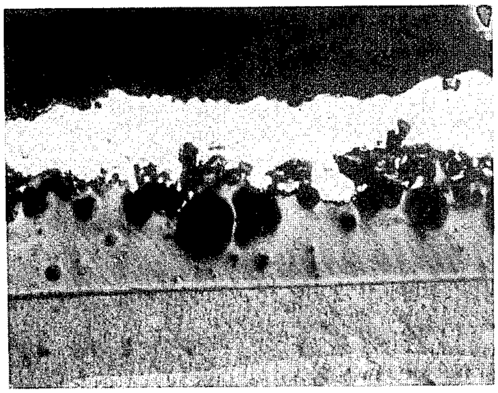

Several different types of hollow glass and ceramic sheres have been utilized. These were from the 3M Company, Emerson Cummings Corp., PQ Corporation, Micro-Mix Corporation, and Pierce and Stevens Chemical Corporation. Those varried in size from 5 to 300 microns. While it was initially thought that the coarser sizes would logically be preferrable, it was found that the sprayed copper deposits adheres very well on practically all sizes, even blends of various hollow spheres give excellent results in proportions varying from about 20% to 70% by volume. It is desireable that at least a layer of the micronsized glass or ceramic spheres be at the surface. In one example, a layer of spheres floated to the surface with about 20% by volume of 3M microballoons TM and after grit-blasting the cured resin, the sprayed copper flowed into the undercoats, cavities and pores, nooks and crannies constituted by the voids of the fractured spheres to effect a strong bond, as shown in the metallographic photograph of FIG. 7. In the preferred practice of this invention, the syntactic resin is heavily filled, (50 to 70% by volume with micronsized spheres) and thus has thixotropic properties such that the spheres stay fixed, which is advantageous on vertical surfaces.

Since the glass or ceramic spheres are intact, they can be premixed in with one or both components of a two component resin, or they can more preferably be added and mixed with the resin at the time of application to the substrate surface.

In a preferred practice of the invention, the copper/-copper alloy metal coating 12 is applied with a minimum of at least two passes of the thermal spray apparatus. In the first pass, the copper particles travelling at high speed splatter and flow into the undercuts, nooks and crannies 13 and fill the surface porosity with molten metal to provide a firmly secured rough layer that avoids detachment and delamination with the undercuts, nooks and crannies thereof providing strong mechanical adhesion and a firm base to which sprayed molten metal applied on the second pass becomes firmly secured. In a preferred practice of the invention, the metal is applied to a thickness of about 3 to 8 mils but it will be appreciated that greater or lesser thicknesses can be applied. After the final copper or copper alloy is applied, the external surface can be smoothed by light wet sanding to remove small projections, edges and produce a smoother hydrodyanmic surface. It will be appreciated that a single pass of the thermal spray apparatus can be used in many instances, and, further by rate of movement of the spray apparatus relative to the surface can be varried to vary the thickness of applied metal. Moreover, the thermal spray apparatus can be stationary and the surface to be coated with metal moved relative thereto.

According to this invention, the resin, filled with hollow ceramic or glass spheres is allowed to cure, and in some cases, the curing is enhanced by the use of a U.V. curable resin.

Commercially pure copper and copper-nickel alloys are preferably used in the practice of the invention for antifouling purposes. Depending on the thermal metal spraying apparatus used, commercially pure copper and/or nickel-copper alloys (90–94% copper and 10–6% nickel, with a 90% copper, 10% nickel alloy being preferred) in the form of wires or powders are used in the practice of the invention. As noted above, in the preferred practice of the invention, the copper base metal and antifouling layer is applied in at least two passes. One would not go beyond the invention in using two different types of thermal spray apparatus during each pass, it being appreciated that it is during the first that the molten particles of copper, traveling at high speeds, will attach and embed themselves in the undercuts, nooks and crannies 13, seal layer 11. During the second pass the molten particles are forced into the undercuts and roughness of the surface left from the previous pass. Preferably the coating applied in the initial or first pass is thinner than in the second and succeeding passes. This thin metal coating provides an excellent base for receiving and securely bonding the thermally sprayed second pass.

In some cases, other constituents, such as dyes, solid state lubricants (to reduce friction) and other biocides can be blended into the copper and/or copper-nickel feed powders.

Copper is softer than copper-nickel alloy, if the use of the area of the boat or ship is such that high abrasion resistance is required, the final thermally sprayed metal layer preferably will be copper-nickel alloy.

In the course of perfecting this invention, various resins were tried and they all worked almost equally well from the adherance standpoint. The final selection is dictated by the type of surface to be treated. For instance, polyester resin is preferred for fiberglass hulls since it more closely matches the polyester gelcoats already present. However, more recent expert opinion indictates the use of epoxy resin for better underwater service and strength. The final thermally sprayed metal coat can be lightly wet sanded as is the practice with racing yachts to produce a smoother surface.

Figure 8A:
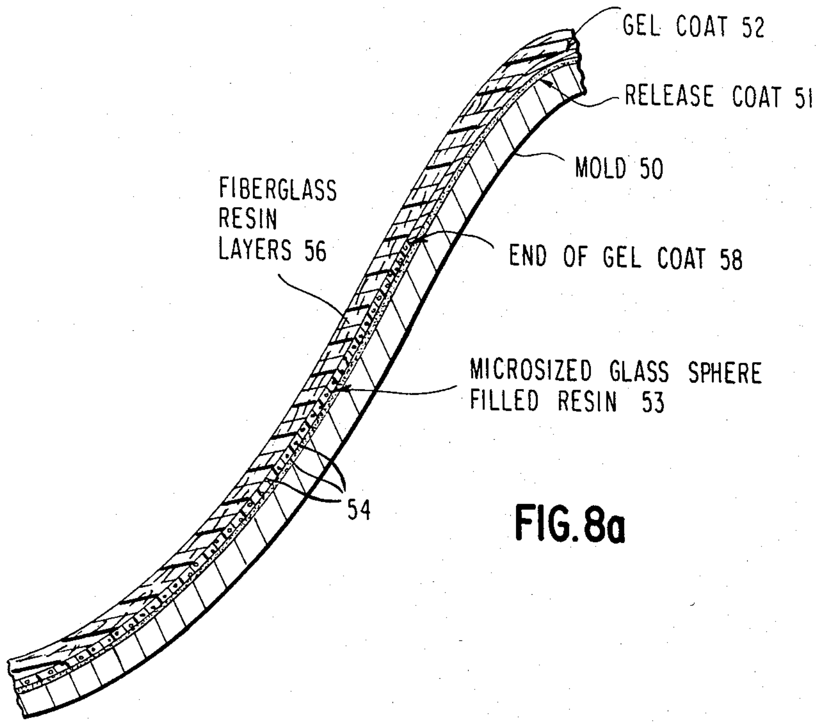
FIG. 8*a* is a sectional view of a mold for a fiberglass hull of a boat and, FIG. 8*b* is a sectional view of the hull removed from the mold and being thermally sprayed with molten copper.
Figure 8B:
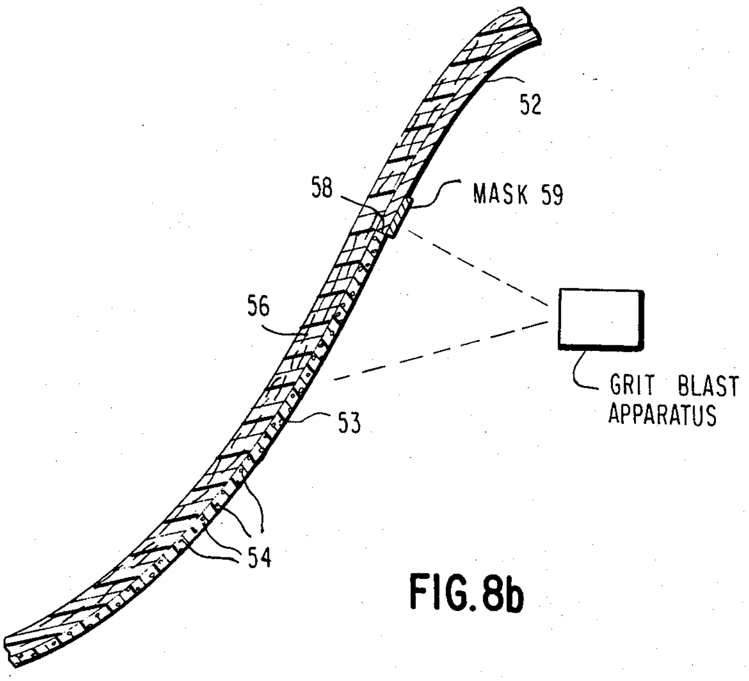

In a further embodiment, as described later herein with regard to FIGS. 8*a* and 8*b*, the substrate may be formed subsequent to the void containing layer. For example, in a new fiberglass hulled boat construction, hollow spherical micronsized bead filled resin is applied to the inside of the mold prior to, or in place of, the gell coat in those areas which are to have antifouling treatment according to this invention. Thereafter, the hull is formed by layering up the resin impregnated fiberglass mats, roving, in the normal manner. After removal from the mold, the sphere filled resin surface is abraided and/or grit-blasted to form the undercuts, nooks and crannies and then sprayed with molten metal particles.

As shown in FIG. 8(*a*), a boat hull mold 50 has a release coating 51 on the inner surface thereof and a conventional gel coat 52 to form the above the water line finish (end of gel coat 58) is applied to the release coat 51, masking (not shown in FIG. 8(*a*)) being used to assure a straight line for aesthetic reasons. Then, a layer of resin (an epoxy or polyester) layer 53 filled with the spheres 54 is applied to the remaining portions of the mold 50 and then the resin is cured. Then, fiberglass and resin 56 is layered in the mold in a conventional fashion to form the basic hull structure of the vessel. It will be appreciated that the interior surface of the cured resin layer 53 can be abraded or grit blasted to form undercuts, pores, nooks and crannies before the layering of the fiberglass structures to form the hull. After curing the resin and fiberglass matrix, the structure is removed from mold 50, the gel coat 58 masked by masking material 59 and the external surface is abraided or grit blasted as indicated in FIG. 8(*b*) and then the step of thermal spraying of molten copper is carried out on this prepared surface in the manner described above.

Instead of metal coating, the fractured or crushed voids bound in a resin matrix may be used as an adherent surface for any other coating or lamina.

Finally, instead of spheres for producing the voids, air bubbles can be formed in the resin, by a foaming agent, for example, after curing of the resin, the voids are fractured by abraiding or grit blasting to produce the desired undercuts, nooks and crannies which then provide the mechanical locking for the coating material.

Figure 9:
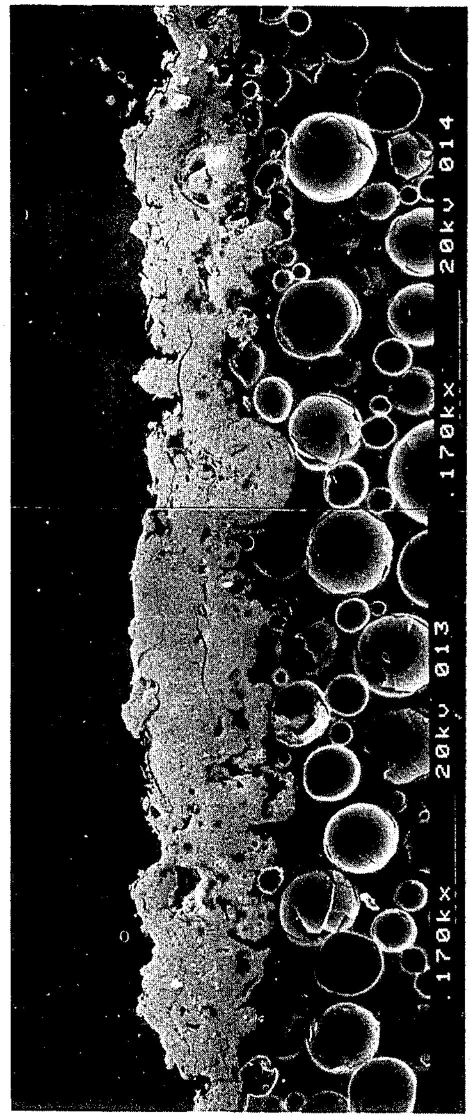
FIG. 9 is a scanning electron microscope photograph of the interface of thermally sprayed copper and ceramic microballoon filled epoxy resin matrix and, FIGS. 10*a*, 10*b* and 10*c* are scanning electron microscope photographs of the metal surface at the magnifications shown.

FIG. 9 is a scanning electron microscope (SEM) photograph of the interfaces of the thermally sprayed copper 80, and abraded surfaces of the micro balloon filled resin 81. These are hollow ceramic balloons (sold by Emerson Cummings Corporation and P.Q. Corporation) and are larger, stronger and cheaper than the glass type and provide a more receptive surface for the initial first layer of thermally sprayed copper coating. In this preferred embodiment, the resin was an epoxy and the largest microballoon was about 100 micron. The copper was about 0.005" and applied in two passes of the thermally sprayed copper.

Figure 10A:
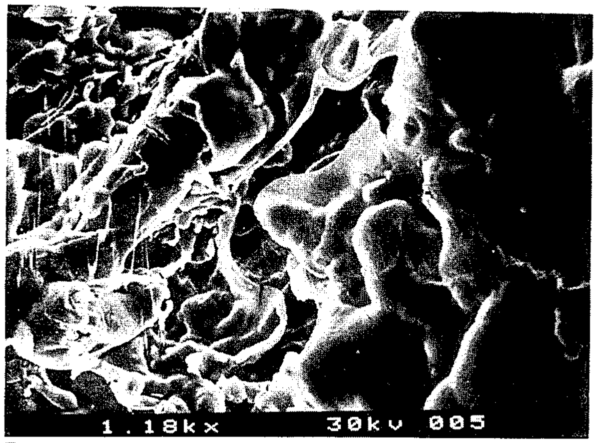
Figure 10B:
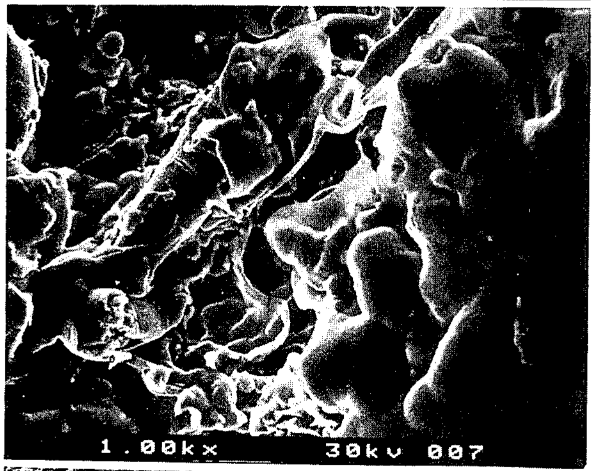
Figure 10C:
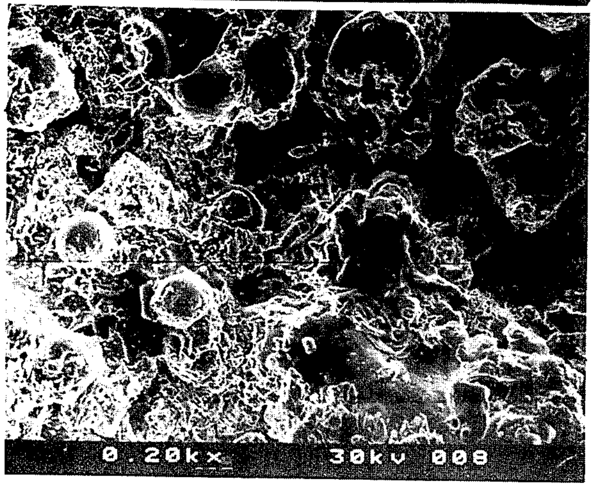

FIGS. 10*a*, 10*b* and 10*c* are SEM's of the sprayed surface of FIG. 9 e.g. copper on U.V. epoxy.

Advantages over the present state of the art are as follows:

1. The coating is a continuous coating of complete 100% antifouling material without the need of a binder as in regular paints or coatings.

2. The coating, being metal (copper and copper-nickel alloys) is stronger than paints and will not wear or erode as quickly, especially around bow and rudder sections.

3. The coating is very ductile from the very nature of the material, i.e., copper, and will not degrade or become brittle with age as in the case of degradation of organic binders.

4. It is easy to apply, since it is sprayed and does not require careful tailoring for curved surface and powders and wires are more economical than the adhesive coated copper-nickel foils.

5. On copper-nickel hulls of two Gulf Coast shrimp boats, the average erosion was approximately 0.05 mil/yr. These are fast moving commercial fishing craft. Slower moving sailing and pleasure craft hulls are conservatively expected to erode at less than ½ mil/yr. Therefore, a coating of 6 to 8 mils should conservatively last at least 12 years. Present intervals for hauling, scraping, and painting depend on water temperature, usually averaging at least once a year.

6. Repairs can be easily made by lightly grit-blasting the damaged area, applying the syntactic foam adhesive and abraiding and spraying an overlaping coat of copper/copper alloy. To speed up such repairs, the resin carries for the spheres can be a U.V. resin which cures more rapidly under ultraviolet exposure.

7. The copper/copper-nickel alloys present considerably less toxicity and handling problems in comparison to the complex organotin compounds.

8. Hydrodynamic properties of hull surfaces are not changed.

9. Since the copper/copper-nickel coatings are relatively thin, flexible, and strongly adherent to the outer hull surfaces by the mechanical interlocking of the metal when it solidifies in the undercuts, nooks and crannies 13, they flex with flexure of the hull and strongly resist delamination forces thereby asuring a longer life.

10. The unfractured or intact spheres serve as an insulating function.

11. The coating has high "scrubability" as compared to paints since it is metal and not an organic material.

Samples with thermal spray coatings according to this invention were tested in the Chesapeake Bay waters during the summer of 1983. The results showed no biomarine growth on the copper sprayed surfaces, while there was considerable growth and barnacies and other marine organisms on the uncoated portion of the test specimens.

Samples tested by Ocean City Research Corporation in Ocean City, Md. during the summer of 1983, also showed no marine growth and the coatings stayed intact.

The density of the spray deposits are not as dense as a wrought material such as a foil or plate, so there is a larger microscopic surface area present in the form of cupurous oxide per given area and hence will expose a more hostile surface to marine orgnisms.

The basic improvement in this invention is the increased strength of the bond between the metal coating and the substrate surface and this comes about through the formation of undercuts, nooks and crannies for receiving the liquid coating, preferably molten metal particles, the undercuts, nooks and crannies being formed by fracturing or rupturing the mironsized glass or ceramic spheres in the outer surface of the cured resin carrier.

While the invention has been described with reference to the antifouling treatment of copper and copper alloys or marine surfaces, the invention in its most basic aspect is applicable to cladding materials in general, and particularly metals, and more particularly copper, on any substrate surface.

While there has been shown and described the preferred practice of he invention, it will be understood that this disclosure is for the purpose of illustration and various omissions and changhes may be made thereto without departing from the spirit and scope of the invention as set forth in the claims appended hereto.

What is claimed is:

1. In a marine surface protected from marine growth by an external layer of a thermally sprayed metal selected from copper and copper based alloys, the improvement wherein a layer of an adhesive resin is between said surface and said external layer of metal, a plurality of fractured inorganic hollow spheres in the interface between said resin and said external metal layer forming undercuts, nooks and crannies, said external layer of metal being constituted by a layer of solidified thermally sprayed metal particles sprayed in a molten state and filling and interlocking with said undercuts, nooks and crannies.

2. The invention defined in claim 1 wherein said adhesive resin layer is a syntactic foam coating having an abraded surface to form said fractured inorganic hollow spheres, and said thermally sprayed metal particles are embedded in said fractured inorganic hollow spheres of said syntactic foam coating.

3. The invention defined in claim 1 including a first metal layer with metal particles selected from copper and copper-nickel alloys embedded in said adhesive layer and said layer of thermally sprayed metal particles is sprayed in a molten state at a high velocity on said first metal layer.

4. The invention defined in claim 3 wherein said first metal layer is copper metal and said thermally sprayed metal layer is copper-nickle alloy wherein the copper constitute 90–94% and the remainder is nickel.

5. The invention defined in claim 3 wherein said first metal layer is copper-nickle alloy and said thermally sprayed metal layer is copper.

6. The invention defined in claim 1 wherein said marine surface is a hull and said thermally applied metal layer is thicker in areas of possible mechanical abrasion and erosion, including the keel, bow and rudder areas.

7. The invention defined in claim 3 wherein said first metal layer and said thermally sprayed layer have a combined thickness of at least 3 mils.

8. The invention defined in claim 7 wherein said first metal layer is thinner than said thermally sprayed metal layer.

9. A metal clad surface comprising in combination, a layer of the remains of a plurality of ruptured hollow beads, said hollow beads being selected from the group consisting of glass and or ceramic beads and ranging in size to about 300 microns forming a layer of undercuts, an adhesive matrix securing said remains of a plurality of ruptured hollow beads to said surface, and a solidified metal layer filling said layer of undercuts, to mechanically lock said metal layer to said surface.

10. The metal clad surface defined in claim 9 wherein said adhesive matrix is a U.V. cured epoxy.

11. The metal clad surface defined in claim 9 wherein said metal layer is copper metal including alloys thereof.

12. The metal clad surface defined in claim 11 wherein said surface is a marine surface and said copper metal inhibits incrustation of said surface.

13. In a marine surface protected from marine growth by an external layer of a thermally sprayed molten metal selected from copper and copper based alloys, the improvement comprising, a matrix layer of undercuts, nooks and crannies constituted by a layer of fractured, inorganic hollow spherical bodies, an adhesive layer securing said matrix layer to said marine surface and said layer of metal is constituted by a solidified layer of said molten metal filling and interlocking with said undercuts, nooks and crannies.

14. The invention defined in claim 13 wherein said fractured hollow bodies are the remains of hollow micronsized glass spheres.

15. The invention defined in claim 13 wherein said fractured hollow bodies are the remains of micronsized ceramic spheres.

16. The invention defined in claim 13 wherein said adhesive layer is an epoxy resin.

17. The invention defined in claim 16 wherein said hollow bodies are selected from the group consisting of micronsized glass or ceramic hollow spheres.

18. The invention defined in claim 17 wherein said spheres range in size from about 10 to about 300 microns.

19. The invention defined in claim 18 wherein said spheres comprise from at least about 20 percent by volume of said epoxy resin.

20. The invention defined in claim 19 wherein said hollow spheres are in a proportion greater than 50 percent by volume relative to said adhesive.

21. The invention defined in claim 18 wherein said hollow spheres are in different sizes.

22. The invention defined in claim 17 wherein said micronsized spheres range in size from 10 to about 300 microns and comprise at least 20 percent by volume of said resin.

23. The metal clad surface defined in claim 9 wherein said metal layer is greater than 3 mils thick.

24. The invention defined in claim 13 wherein said marine surface is a portion of the hull of a vessel.

* * * * *